United States Patent [19]

Masumoto et al.

[11] Patent Number: 5,349,529
[45] Date of Patent: Sep. 20, 1994

[54] METHOD OF CORRECTING MAGNETIZATION VECTOR

[75] Inventors: Yutaka Masumoto; Satoshi Odagawa, both of Saitama, Japan

[73] Assignee: Pioneer Electronic Corporation, Tokyo, Japan

[21] Appl. No.: 901,921

[22] Filed: Jun. 22, 1992

[30] Foreign Application Priority Data

Jun. 25, 1991 [JP] Japan .................. 3-153383

[51] Int. Cl.$^5$ .............................................. G01C 17/38
[52] U.S. Cl. .......................... 364/424.01; 364/571.01; 364/559; 33/355 R; 33/357; 33/358
[58] Field of Search ............... 364/571.01, 559, 424.01; 33/355 R, 356, 357, 358

[56] References Cited

U.S. PATENT DOCUMENTS

| | | | |
|---|---|---|---|
| 4,611,293 | 9/1986 | Hatch et al. | 364/571 |
| 4,797,841 | 1/1989 | Hatch | 364/571.04 |
| 4,989,333 | 2/1991 | Helldörfer et al. | 33/356 |
| 5,021,962 | 6/1991 | Helldörfer et al. | 364/457 |
| 5,046,031 | 9/1991 | Wanous | 364/571.02 |
| 5,117,375 | 5/1992 | Worcester et al. | 364/571.01 |
| 5,131,155 | 7/1992 | Takano et al. | 33/356 |
| 5,151,872 | 9/1992 | Suzuki et al. | 364/571.05 |

*Primary Examiner*—Thomas G. Black
*Assistant Examiner*—Julie D. Day
*Attorney, Agent, or Firm*—Kane, Dalsimer, Sullivan, Kurucz, Levy, Eisele and Richard

[57] ABSTRACT

When the body of an automobile equipped with a stand-alone navigation system is magnetized by an external magnetism, an unknown magnetization vector is determined by correcting the known magnetization vector. Even very small changes in the magnetization vector can be corrected without putting a burden on the user of the automobile. A magnetization vector directed from a reference position toward the center of a magnetic circle which indicates the magnetized condition of the automobile body is detected, and a geomagnetic vector which is directed from the reference position in the direction in which the mobile body progresses is detected. An instantaneous direction vector which is directed from the center of the magnetic circle in the direction in which the mobile body progresses and which has a direction angle is calculated. Then, an average geomagnetic intensity is calculated from the average of past values of the magnitude of the instantaneous direction vector, and a weighting coefficient that is a positive real number of or less than 1 is calculated based on the average geomagnetic intensity. A substantially instantaneous magnetization vector for correcting the magnetization vector is calculated. Thereafter, a corrected magnetization vector is calculated from the magnetization vector, the weighting coefficient, and the substantially instantaneous magnetization vector.

5 Claims, 11 Drawing Sheets

METHOD OF CORRECTING MAGNETIZATION VECTOR

BACKGROUND OF THE INVENTION

1. Field of the Invention

The present invention relates to a method of correcting a magnetization vector, and more particularly to a method of determining the vector of an unknown magnetization from the vector of a known magnetization when a mobile unit incorporating a stand-alone navigation system is magnetized by an external magnetism.

2. Description of the Prior Art

When an automobile passes through a railway crossing, a bridge, or the like, the magnetized state of body of the automobile tends to be varied, or the automobile body tends to be magnetized.

When the automobile body is magnetized, a geomagnetic sensor of the navigation system is also magnetically changed such that, as shown in FIG. 9 of the accompanying drawings, a magnetic circle shifts from $C_1$ to $C_2$ or the vector of the magnetization shifts from $M_1$ to $M_2$. The stand-alone navigation system is required to determine a direction vector from a new magnetization vector at all times. Therefore, if a direction vector were determined from the magnetization vector $M_1$ before the magnetization of geomagnetic sensor is changed, then the direction vector would become $R_1$ while the correct direction vector is in fact indicated by $R_2$. As a result, the determined direction would be in error. A detected geomagnetic vector from a reference point 0 is represented by $S_A$ in FIG. 9.

To avoid the above error, there is known a turn correction or one-rotation correction process in which the automobile body is turned around 360° to determine the new magnetization vector. The one-rotation correction process will be described below with reference to FIG. 10 of the accompanying drawings. As shown in FIG. 10, if maximum and minimum values $V_{xmax}$, $V_{xmin}$ of a magnetization $V_x$ in an X direction, and maximum and minimum values $V_{ymax}$, $V_{ymin}$ of a magnetization $V_y$ in a Y direction are known, then the coordinates of the center P of a magnetic circle, i.e., the coordinates of the tip end of a magnetization vector M, can be determined as follows:

$$P\left(\frac{V_{xmax} - V_{xmin}}{2}, \frac{V_{ymax} - V_{ymin}}{2}\right) \quad (1)$$

Therefore, the magnetization vector M can be determined. This one-rotation correction process needs a space in which to rotate the automobile, and also requires a tedious and time-consuming procedure to be carried out for determining the magnetization vector M. Therefore, the one-rotation correction process has been putting a burden on the user of the navigation system.

Another known correction process which is free from the shortcomings of the one-rotation correction process employs an angular velocity sensor combined with a geomagnetic sensor. This correction process will be described below with reference to FIGS. 11A and 11B of the accompanying drawings.

First, an output signal from the angular velocity sensor is integrated, and thereafter converted into angle outputs $v_x$, $v_y$ which are then plotted on the plane of geomagnetic sensor as shown in FIG. 11B.

The plotted point has coordinates $(v_x, v_y)$. The difference or deviation between the output signals from the geomagnetic sensor and the angular velocity sensor is monitored at all times. The coordinates $(V_x, V_y)$ of output signal from geomagnetic sensor is shown in FIG. 11A. The deviations $\sigma_x$, $\sigma_y$ in X, Y directions between the output signals from the geomagnetic sensor and the angular velocity sensor are given as follows:

$$\sigma_x = V_x - v_x \quad (2),$$

$$\sigma_y = V_y - v_y \quad (3).$$

If no magnetic disturbance is applied to the geomagnetic sensor, then $\sigma_x = k_1$ (constant) and $\sigma_y = k_2$ (constant). These deviations are initialized, i.e., set to $\sigma_x = 0$ and $\sigma_y = 0$, and thereafter monitored. Then, when $\sigma_x$, $\sigma_y < k$ (k: a constant representing a threshold), it is determined that the automobile body is not magnetized, and when $\sigma_x$, $\sigma_y \geq k$, it is determined that the automobile body is magnetized.

As shown in FIG. 12 of the accompanying drawings, a deviation vector $\Sigma$ (whose components are $\sigma_x$, $\sigma_y$) is added to a magnetization vector $M_{n-1}$ prior to the magnetization of the automobile body, thus finding a new magnetization vector $M_n$, as follows:

$$M_n = M_{n-1} + \Sigma \quad (4)$$

The above correction process which employs the angular velocity sensor can determine a new magnetization vector without imposing an undue burden on the user.

One problem with this correction process resides in the selection of a value for the threshold k. While no automobile body magnetization is assumed to occur when the values of $\sigma_x$, $\sigma_y$ are less than the threshold k, a magnetic body is generally magnetized to a certain extent by a small magnetic field as it exhibits hysteresis unless subjected to a very small magnetizing force. Consequently, the correction process is not effective in correcting very small changes in magnetization vectors.

SUMMARY OF THE INVENTION

It is an object of the present invention to provide a method of correcting a very small change in a magnetization vector for the detection of a new magnetization vector without imposing an undue burden on the user of a system which is affected by the magnetization vector.

According to the present invention, there is provided a method of correcting a magnetization vector, comprising detecting a magnetization vector $M_{n-1}$ directed from a reference position toward the center of a magnetic circle which indicates the magnetized condition of a mobile body; detecting a geomagnetic vector $S_n$ which is directed from the reference position in the direction in which the mobile body progresses; calculating an instantaneous direction vector $R_n$ which is directed from the center of the magnetic circle in the direction in which the mobile body progresses and which has a direction angle $\theta_{mn}$ according to the equation $R_n = S_n - M_{n-1}$; calculating an average geomagnetic intensity $r_{on}$ from the average of past values of the magnitude $r_n$ of the instantaneous direction vector $R_n$, and a weighting coefficient $h_n$ that is a positive real number of or less than 1 based on the average geomagnetic intensity $r_{on}$; calculating a substantially instantaneous magnetization vector $H_n$ for correcting the magnetization vector $M_{n-1}$ according to the equation: $H_n = S_n - r_{on} \cdot \exp(j\theta_{mn})$; and calculating a corrected magnetization vector $M_n$ from the magnetization vector $M_{n-1}$, the weighting coefficient $h_n$, and the substantially instantaneous magnetization vector $H_n$ according to the equation: $M_n = (1 - h_n) \cdot M_{n-1} + h_n \cdot H_n$.

According to the present invention, there is also provided a method of correcting a magnetization vector, comprising detecting a magnetization vector $M_{n-1}$ directed from a reference position toward the center of a magnetic circle which indicates the magnetized condition of a mobile body; detecting a geomagnetic vector $S_n$ which is directed from the reference position in the direction in which the mobile body progresses; reading an output signal from an angular velocity sensor, and calculating a deviation vector $\Sigma(\sigma_x, \sigma_y)$ which indicates the deviation of the output signal of the angular velocity sensor from the geomagnetic vector, determining whether or not the component $\sigma_x$ or $\sigma_y$ is equal to or greater than a constant k; if the component $\sigma_x$ or $\sigma_y$ is equal to or greater than the constant k, calculating a corrected magnetization vector $M_n$ according to the equation $M_n = M_{n-1} + \Sigma$; if the component $\sigma_x$ or $\sigma_y$ is smaller than the constant k, calculating an instantaneous direction vector $R_n$ which is directed from the center of the magnetic circle in the direction in which the mobile body progresses and which has a direction angle $\theta_{mn}$ according to the equation $R_n = S_n - M_{n-1}$; calculating an average geomagnetic intensity $r_{on}$ from the average of past values of the magnitude $r_n$ of the instantaneous direction vector $R_n$, and a weighting coefficient $h_n$ that is a positive real number of or less than 1 based on the average geomagnetic intensity $r_{on}$; calculating a substantially instantaneous magnetization vector $H_n$ for correcting the magnetization vector $M_{n-1}$ according to the equation: $H_n = S_n - r_{on} \cdot \exp(j\theta_{mn})$; and calculating a corrected magnetization vector $M_n$ from the magnetization vector $M_{n-1}$, the weighting coefficient $h_n$, and the substantially instantaneous magnetization vector $H_n$ according to the equation: $M_n = (1 - h_n) \cdot M_{n-1} + h_n \cdot H_n$.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

First, the principles of the present invention will be described below with reference to FIGS. 1 and 2.

Figure 1:
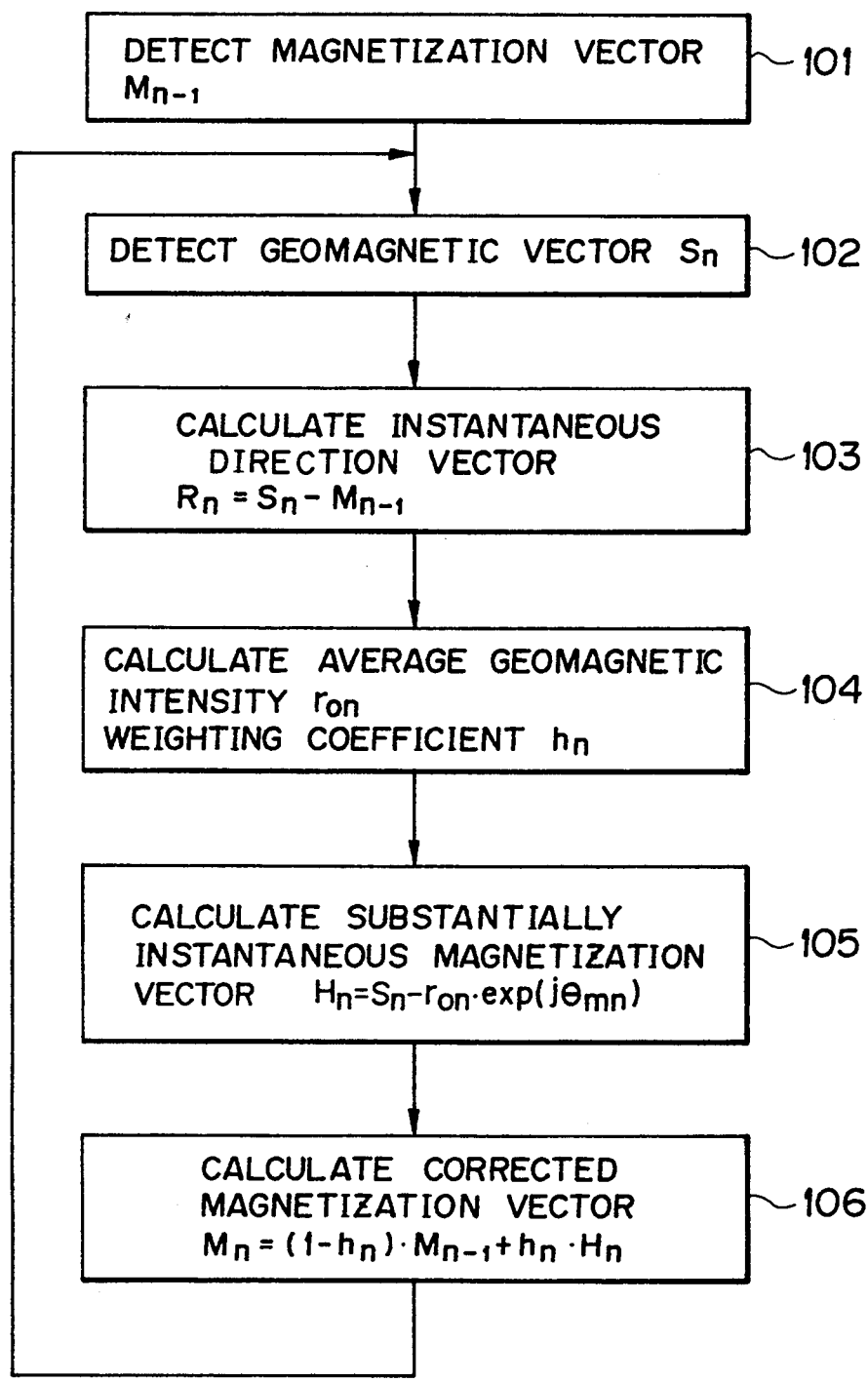
FIG. 1 is a flowchart showing of principles of the present invention.

In FIG. 1, a magnetization vector $M_{n-1}$ directed from a reference position toward the center of a magnetic circle which indicates the magnetized condition of a mobile body such as an automobile is detected in a step 101. Then, a geomagnetic vector $S_n$ which is directed from the reference position in the direction in which the mobile body progresses is detected in a step 102. An instantaneous direction vector $R_n$ which is directed from the center of the magnetic circle in the direction in which the mobile body progresses and which has a direction angle $\theta_{mn}$ is calculated according to the equation $R_n = S_n - M_{n-1}$ in a step 103. Then, an average geomagnetic intensity $r_{on}$ is calculated from the average of past values of the magnitude $r_n$ of the instantaneous direction vector $R_n$, and a weighting coefficient $h_n$ that is a positive real number of or less than 1 is calculated based on the average geomagnetic intensity $r_{on}$ in a step 104. A substantially instantaneous magnetization vector $H_n$ for correcting the magnetization vector $M_{n-1}$ is calculated according to the equation: $H_n = S_n - r_{on} \cdot \exp(j\theta_{mn})$ in a step 105. Thereafter, a corrected magnetization vector $M_n$ is calculated from the magnetization vector $M_{n-1}$, the weighting coefficient $h_n$, and the substantially instantaneous magnetization vector $H_n$ according to the equation: $M_n = (1 - h_n) \cdot M_{n-1} + h_n \cdot H_n$ in a step 106.

According to the process shown in FIG. 1, the instantaneous direction vector $R_n$ is calculated from the magnetization vector $M_{n-1}$ that can easily be measured and detected and the detected geomagnetic vector $S_n$. The average geomagnetic intensity $r_{on}$ is calculated from past values of the magnitude $r_n$ of the instantaneous direction vector $R_n$, and the weighting coefficient $h_n$ is calculated from the average geomagnetic intensity $r_{on}$. The substantially instantaneous magnetization vector $H_n$ is calculated from the geomagnetic vector $S_n$, the average geomagnetic intensity $r_{on}$, and the direction angle $\theta_{mn}$ of the instantaneous direction vector $R_n$. The true magnetization vector $M_n$ is determined by correcting the magnetization vector $M_{n-1}$ with the substantially instantaneous magnetization vector $H_n$ and the weighting coefficient $h_n$.

Figure 2:
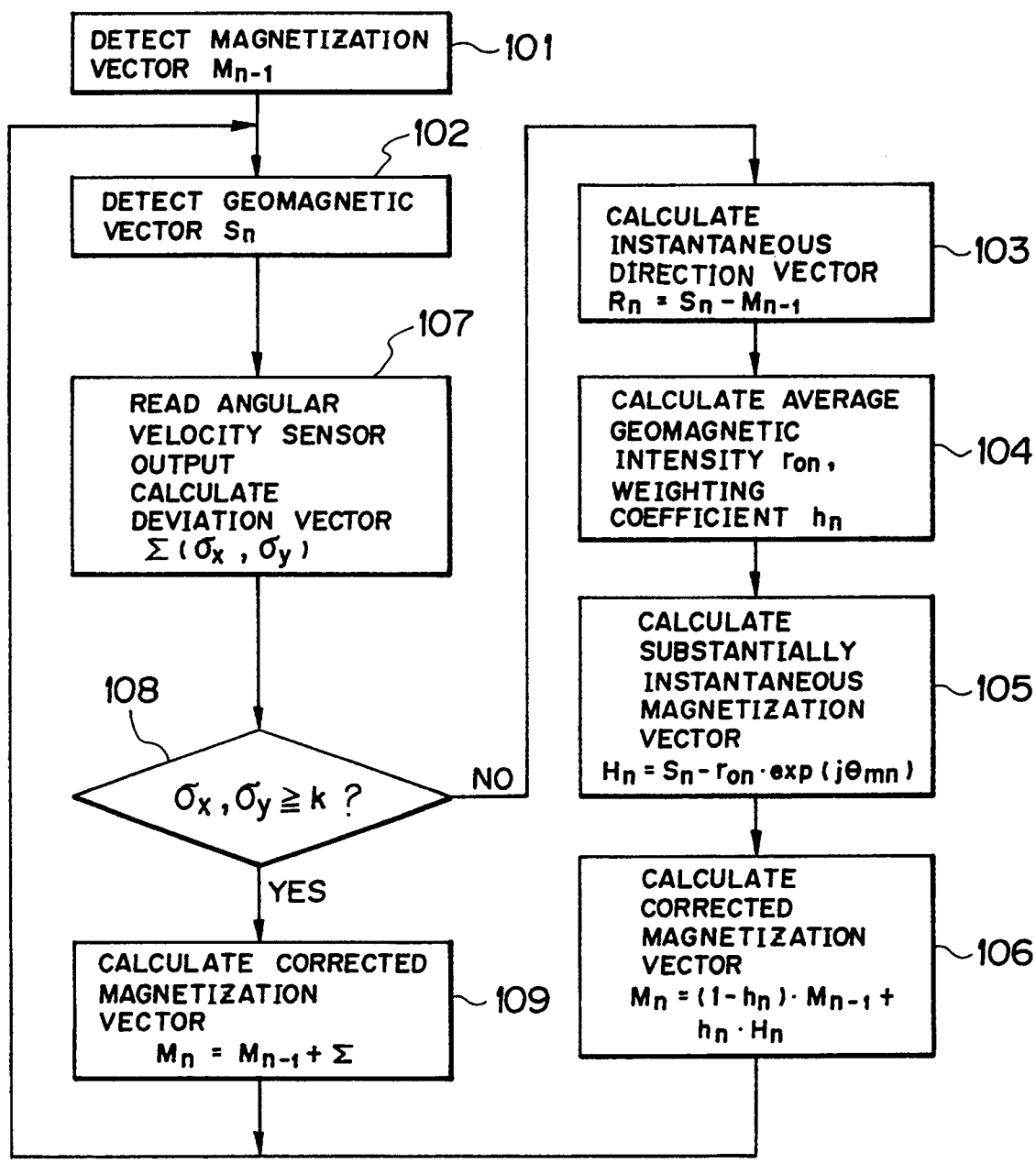
FIG. 2 is a flowchart showing of principles of the present invention.

In FIG. 2, a magnetization vector $M_{n-1}$ directed from a reference position toward the center of a magnetic circle which indicates the magnetized condition of a mobile body such as an automobile is detected in a step 101. Then, a geomagnetic vector $S_n$ which is directed from the reference position in the direction in which the mobile body progresses is detected in a step 102. An output signal from an angular velocity sensor is read, and a deviation vector $\Sigma(\sigma_x, \sigma_y)$ which indicates the deviation of the output signal of the angular velocity sensor from the geomagnetic vector is calculated in a step 107. Then, a step 108 determines whether or not the component $\sigma_x$ or $\sigma_y$ is equal to or greater than a constant k. If the component $\sigma_x$ or $\sigma_y$ is equal to or greater than the constant k, then a corrected magnetization vector $M_n$ is calculated according to the equation $M_n = M_{n-1} + \Sigma$ in a step 109. If the component $\sigma_x$ or $\sigma_y$ is smaller than the constant k, then an instantaneous direction vector $R_n$ which is directed from the center of the magnetic circle in the direction in which the mobile body progresses and which has a direction angle $\sigma_{mn}$ is calculated according to the equation $R_n = S_n - M_{n-1}$ in a step 103. Then, an average geomagnetic intensity $r_{on}$ is calculated from the average of past values of the magnitude $r_n$ of the instantaneous direction vector $R_n$, and a weighting coefficient $h_n$ that is a positive real number of or less than 1 is calculated based on the average geomagnetic intensity $r_{on}$ in a step 104. A substantially instantaneous magnetization vector $H_n$ for correcting the magnetization vector $M_{n-1}$ is calculated according to the equation: $H_n = S_n - r_{on} \cdot \exp(j\theta_{mn})$ in a step 105. Thereafter, a corrected magnetization vector $M_n$ is calculated from the magnetization vector $M_{n-1}$, the weighting coefficient $h_n$, and the substantially instantaneous magnetization vector $H_n$ according to the equation: $M_n = (1-h_n) \cdot M_{n-1} + h_n \cdot H_n$ in a step 106.

According to the process shown in FIG. 2, if the component $\sigma_x$ or $\sigma_y$ of the deviation vector $\Sigma$ is equal to or greater than the constant k, then the corrected magnetization vector $M_n$ is calculated according to the equation $M_n = M_{n-1} + \Sigma$. If the component $\sigma_x$ or $\sigma_y$ is smaller than the constant k, then the true magnetization vector $M_n$ is determined from the magnetization vector $M_{n-1}$, the substantially instantaneous magnetization vector $H_n$, and the weighting coefficient $h_n$, as with the process shown in FIG. 1.

1ST EMBODIMENT

Figure 3:
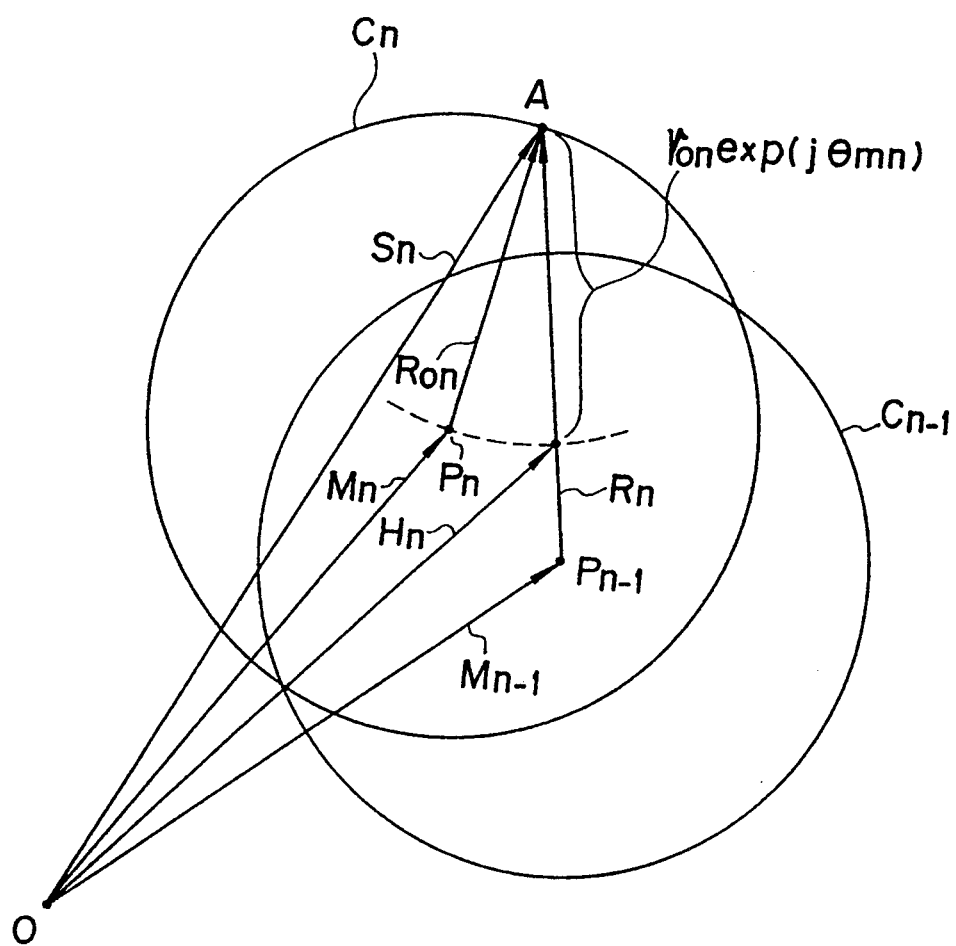
FIG. 3 is a diagram illustrative of a method according to a first embodiment of the present invention.
Figure 4:
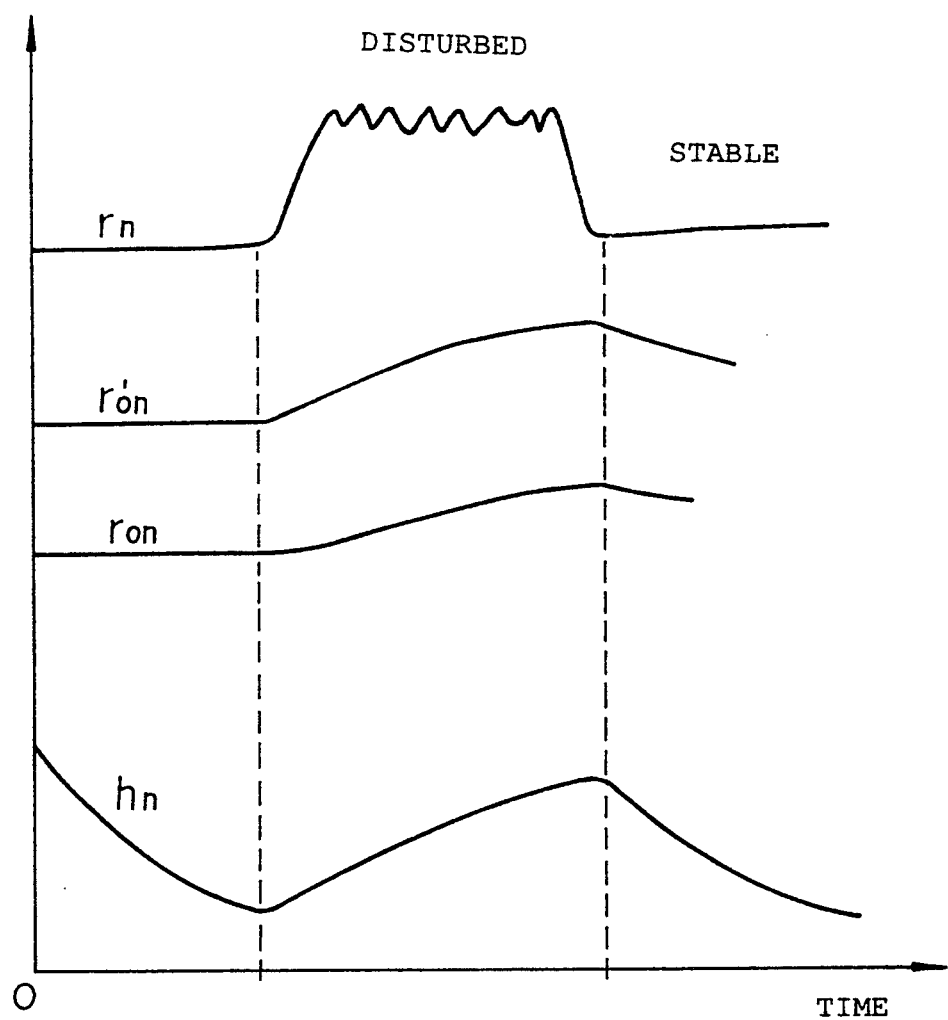
FIG. 4 is a graph showing the manner in which coefficients shown in FIG. 2 vary with time.
Figure 5:
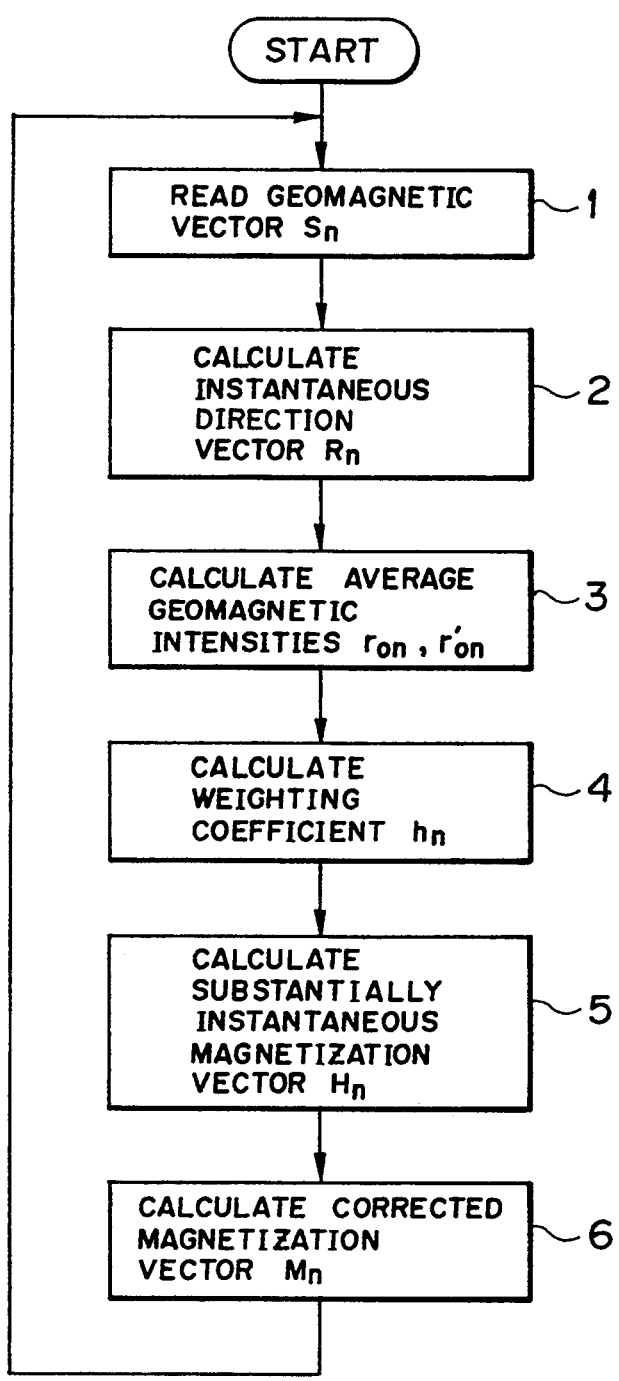
FIG. 5 is a flowchart of the method according to the first embodiment.

FIGS. 3 through 5 show a method for correcting a magnetization vector according to a first embodiment of the present invention. The method is used with respect to a geomagnetic sensor in a navigation system on an automobile. As shown in FIG. 3, it is assumed that a known magnetization vector is represented by $M_{n-1}$ and a new unknown magnetization vector to be determined is represented by $M_n$. An instantaneous direction vector $R_n$ is indicated by:

$$R_n = r_n \cdot \exp(j\theta_{mn}) \qquad (5)$$

where $r_n$ is the magnitude of the vector and $\theta_{mn}$ is the direction of the vector. An average direction vector $R_{on}$ is indicated by:

$$R_{on} = r_{on} \cdot \exp(j\theta_{on}) \qquad (6)$$

where $r_{on}$ is the magnitude of the vector and $\theta_{on}$ is the direction of the vector. The instantaneous direction vector $R_n$ is a vector whose magnitude and direction can vary greatly. The average direction vector $R_{on}$ is a vector whose magnitude and direction do not vary greatly and which is considered to point a correct direction on the average.

The concept of a substantially instantaneous magnetization vector is introduced here. In FIG. 3, the substantially instantaneous magnetization vector is represented by $H_n$, and a geomagnetic vector that can be detected by observations or measurements is represented by $S_n$. Since the substantially instantaneous magnetization vector $H_n$ and the geomagnetic vector $S_n$ are related to each other in FIG. 3 by:

$$S_n = H_n + r_{on} \cdot \exp(j\theta_{mn}) \qquad (7),$$

the substantially instantaneous magnetization vector $H_n$ is determined as follows:

$$H_n = S_n - r_{on} \cdot \exp(j\theta_{mn}) \qquad (8).$$

The substantially instantaneous magnetization vector $H_n$ can thus be determined by subtracting, from the detected geomagnetic vector $S_n$, a vector $r_{on} \cdot \exp(j\theta_{mn})$ whose direction is the same as the direction $\theta_{mn}$ of the instantaneous direction vector $R_n$ and whose magnitude is the same as the magnitude $r_{on}$ of the average direction vector $R_{on}$.

The magnetization vector $M_n$ can be determined from the known magnetization vector $M_{n-1}$ and the substantially instantaneous magnetization vector $H_n$ according to the following equation:

$$M_n = (1-h_n) \cdot M_{n-1} + h_n \cdot H_n \qquad (9)$$

where $h_n$ is a weighting coefficient which is a real number variable in the range; $0 \leq h_n \leq 1$. Assuming that $r'_{on}$, $r_{on}$ indicate averages of several or more values of the vector magnitude $r_n$ in the past, the weighting coefficient $h_n$ is selected so as to be proportional to $(r_n - r_{on})$ or $(r'_{on} - r_{on})$, i.e., to approach "1" when the magnetic disturbance is large and approach "0" when the magnetic disturbance is small and stable. For example, the weighting coefficient $h_n$ may be given by the following equation:

$$h_n = (1-\gamma) \cdot h_{n-1} + \gamma \cdot |(r'_{on} - r_{on})/r_{on}| \qquad (10)$$

where $\gamma$ is a constant of 0.005, for example. The weighting coefficient $h_n$ has an initial value $h_o$ of 1. The values $r_n$, $r'_{on}$, $r_{on}$, and $h_n$ vary with time as shown in FIG. 4.

As shown in FIG. 4, the weighting coefficient $h_n$ and hence the magnetization vector $M_n$ vary depending on the magnetic condition. When the magnetic disturbance is larger, the weighting on the substantially instantaneous magnetization vector $H_n$ in the equation (9) increases, and when the magnetic disturbance is small and stable, the weighting on the known magnetization vector $M_{n-1}$ increases.

While the past averages $r'_{on}$, $r_{on}$ are used in the above, only the average $r_{on}$ may be used to determine the weighting coefficient $h_n$ as follows:

$$h_n = (1-\gamma) \cdot h_{n-1} + \gamma \cdot |(r'_n - r_{on})/r_{on}| \qquad (11).$$

Instead of the simple averages $r'_{on}$, $r_{on}$, the following values may be employed:

$$r'_{on} = (1-h_{n-1}) \cdot r'_{on-1} + h_{n-1} \cdot r_n \qquad (12),$$

$$r_{on} = (1-h_{n-1}) \cdot r_{on-1} + h_{n-1} \cdot r'_n \qquad (13).$$

Initial values $r'_{oo}$, $r_{oo}$ for the respective averages $r'_{on}$, $r_{on}$ are set to known geomagnetic intensities (magnetic circle radii).

FIG. 5 is a flowchart of the method for detecting a magnetization vector according to the first embodiment of the present invention. First, a detected geomagnetic vector $S_n$ is read in a step 1. Then, an instantaneous direction vector $R_n$ is calculated according to the equation: $R_n = S_n - M_{n-1}$ in a step 2. In a step 3, average geomagnetic intensities are calculated according to the respective equations: $r'_{on} = (1-h_{n-1}) \cdot r'_{on-1} + h_{n-1} \cdot r_n$, $r_{on} = (1-h_{n-1}) \cdot r_{on-1} + h_{n-1} \cdot r'_n$. The step 3 is followed by a step 4 in which a weighting coefficient $h_n$ is calculated according to the equation: $h_n = (1-\gamma) \cdot h_{n-1} + \gamma \cdot |(r'_n - r_{on})/r_{on}|$. In a next step 5, a substantially instantaneous magnetization vector $H_n$ is calculated according to the equation: $H_n = S_n - r_{on} \cdot \exp(j\theta_{mn})$. A magnetization vector $M_n$ to be determined is finally calculated according to the equation: $M_n = (1-h_n) \cdot M_{n-1} + h_n \cdot H_n$.

Figure 6:
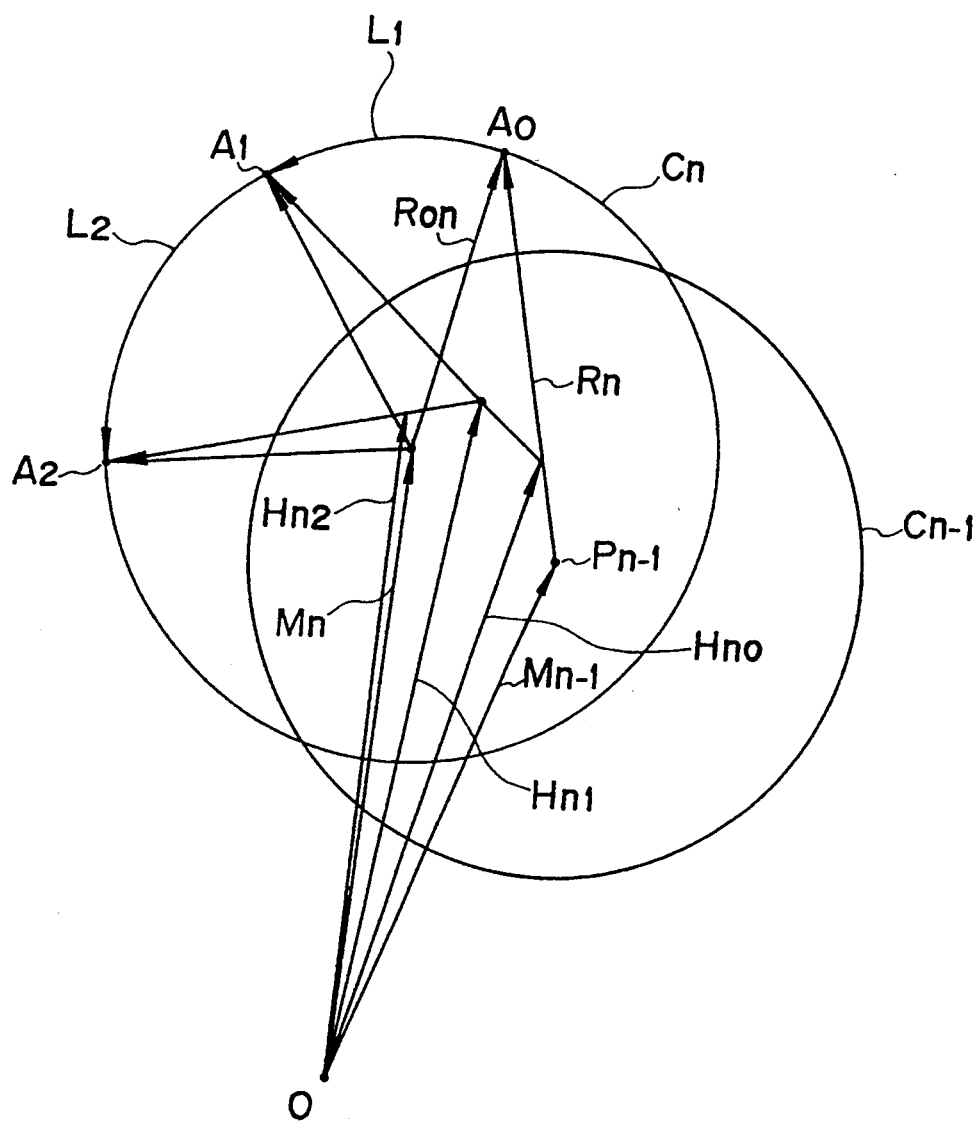
FIG. 6 is a diagram showing the manner in which the method according to the first embodiment operates.

FIG. 6 shows the manner in which the substantially instantaneous vector $H_n$ moves when the automobile passes through a railway crossing and then turns left twice as indicated by $L_1$, $L_2$. When the automobile passes through the railway crossing, the substantially instantaneous vector $H_n$ changes to a vector $H_{n0}$. Then, the substantially instantaneous vector $H_n$ changes to $H_{n1}$, $H_{n2}$ as the automobile subsequently makes left turns $L_1$, $L_2$. In this manner, the substantially instantaneous vector $H_n$ progressively approaches the magnetization vector to be determined. Consequently, the method according to the first embodiment is free from the drawbacks of the conventional one-rotation correction process and the process employing an angular velocity sensor.

2ND EMBODIMENT

Figure 7:
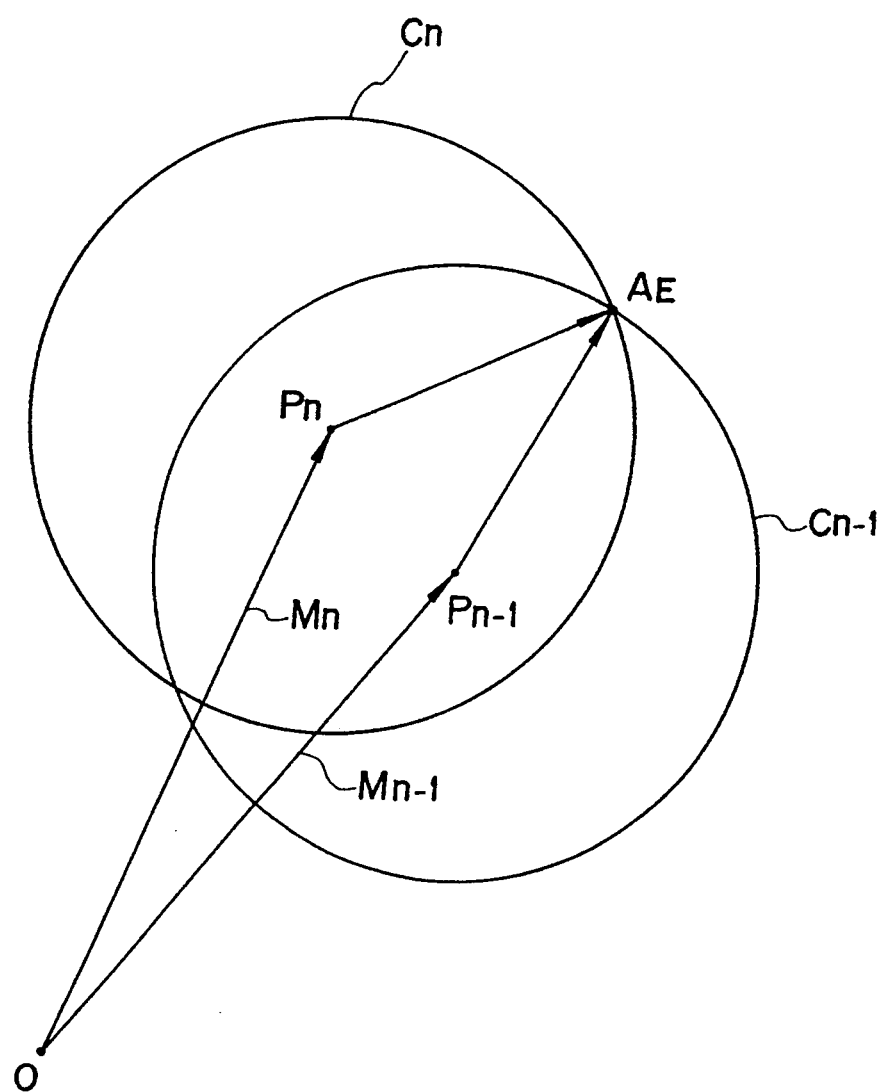
FIG. 7 is a diagram showing a problem with the method according to the first embodiment.

In the first embodiment described above, if the automobile runs straight in a direction $A_E$, for example, in which new and old magnetic circles are superimposed on each other, as shown in FIG. 7, then the substantially instantaneous vector $H_n$ and the known magnetization vector $M_{n-1}$ become equal to each other ($H_n = M_{n-1}$), and the substantially instantaneous vector $H_n$ would not approach the magnetization vector $M_n$ unless the automobile made a left or right turn. To solve such a problem, a method for detecting a magnetization vector according to a second embodiment of the present invention employs a process which uses an angular velocity sensor in the method according to the first embodiment. The process using the angular velocity sensor is carried out for rough adjustment to approach the magnetization vector $M_n$, and then the method according to the first embodiment is relied on for fine adjustment to approach the magnetization vector $M_n$.

Figure 8:
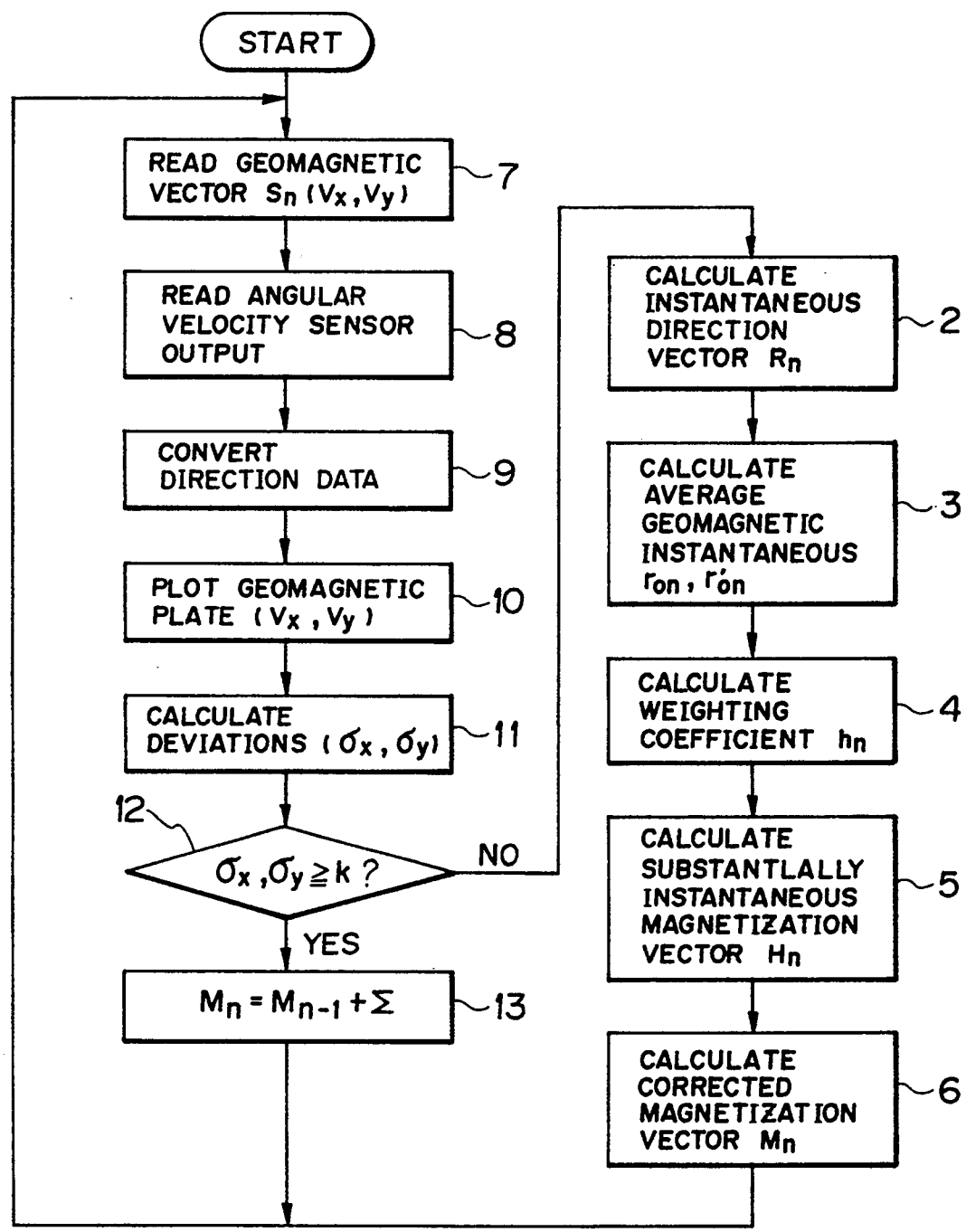
FIG. 8 is a flowchart of a method according to a second embodiment of the present invention.
Figure 9:
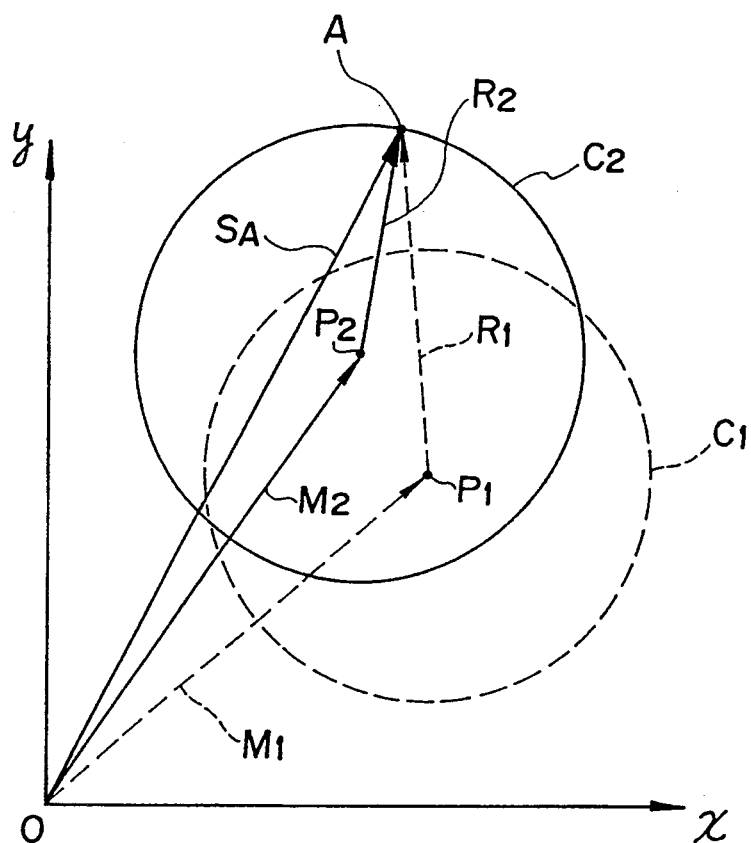
FIG. 9 is a diagram showing the manner in which a magnetic circle changes when an automobile body is magnetized.
Figure 10:
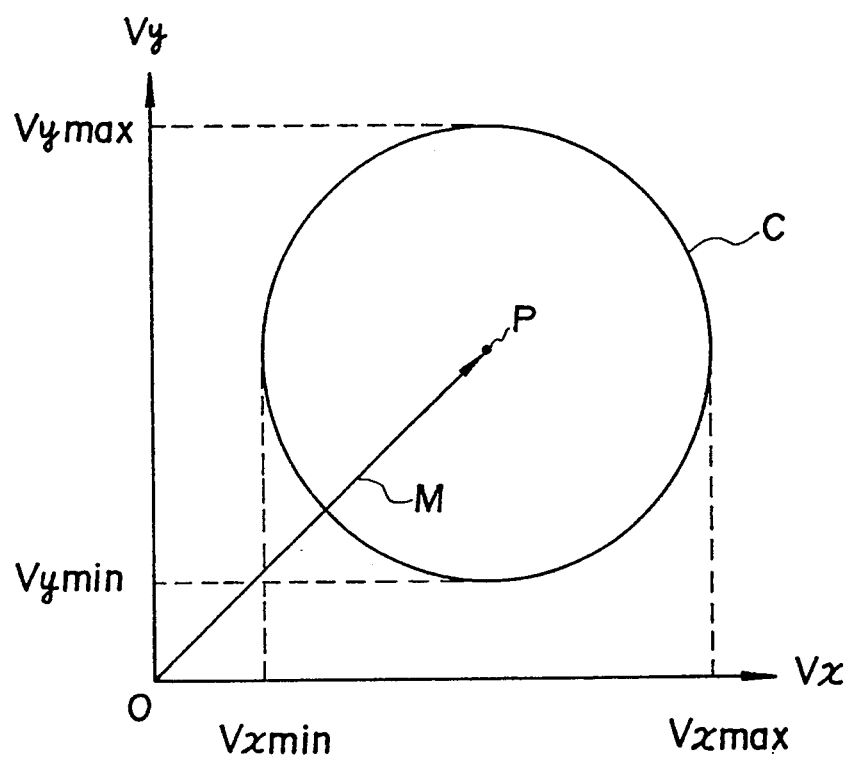
FIG. 10 is a diagram illustrative of a method of detecting a magnetization vector according to a conventional one-rotation correction process.
Figure 11:
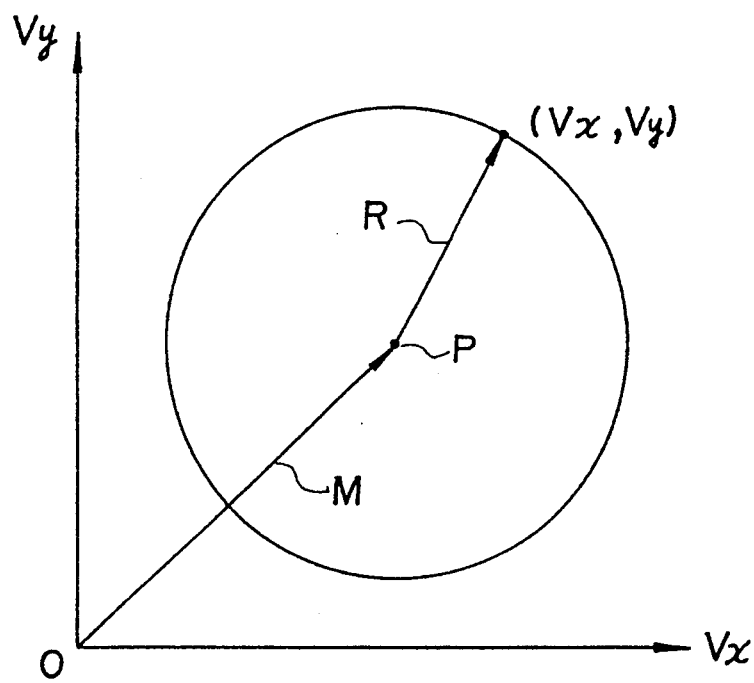
FIGS. 11A and 11B are diagrams illustrative of deviations between output signals from geomagnetic and angular velocity sensors.
Figure 11B:
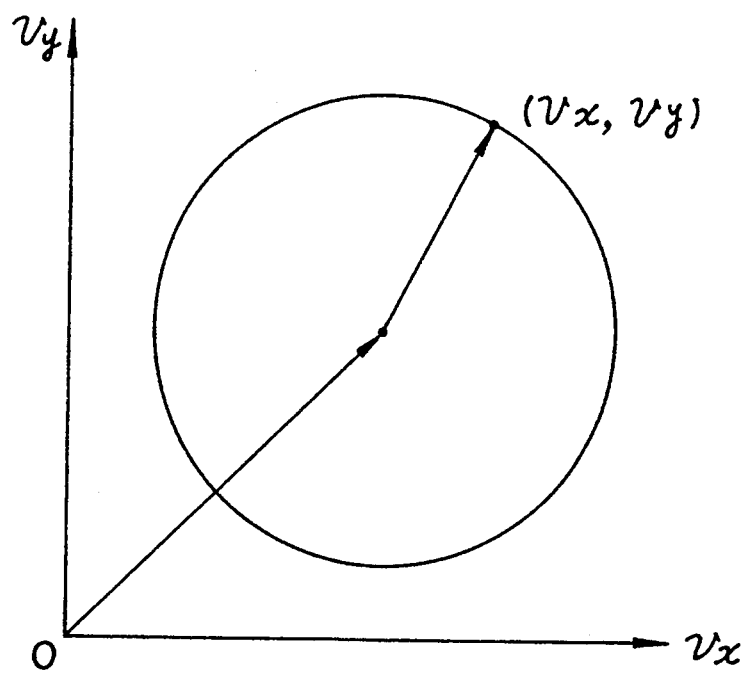
Figure 12:
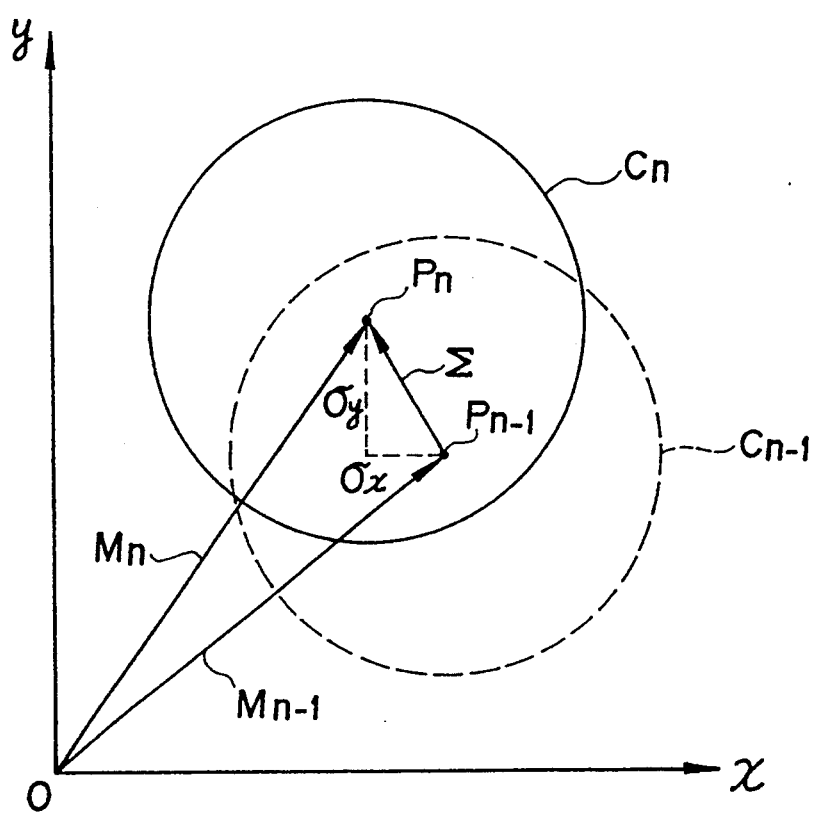
FIG. 12 is a diagram illustrative of a method of detecting a magnetization vector using an angular velocity sensor in combination with a geomagnetic sensor.

FIG. 8 is a flowchart of the method for detecting a magnetization vector according to the second embodiment of the present invention. First, a detected geomagnetic vector $S_n(V_x, V_y)$ is read in a step 7. Then, an output signal from the angular velocity sensor is read in a step 8, and thereafter converted into angle outputs $v_x$, $v_y$ in a step 9, which are then plotted on the plane of geomagnetic sensor in a step 10. Thereafter, the deviations $\sigma_x$, $\sigma_y$ in X, Y directions between the output signals from the geomagnetic sensor and the angular velocity sensor are calculated according to the equations: $\sigma_x = V_x - v_x$, $\sigma_y = V_y - v_y$ in a step 11. A next step 12 determines whether or not the deviations $\sigma_x$, $\sigma_y$ are equal to or greater than a constant k ($\sigma_x, \sigma_y \geq k$). If the deviations $\sigma_x$, $\sigma_y$ are not equal or greater than the constant k, then control goes to steps 2 through 6 which are the same as the steps 2 through 6 shown in FIG. 5. If the deviations $\sigma_x$, $\sigma_y$ are equal or greater than the constant k, then control goes to a step 13 in which the magnetization vector Mn is calculated according to the equation: $M_n = M_{n-1} + \Sigma$ where $\Sigma$ is a deviation vector whose components are $\sigma_x$, $\sigma_y$.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of correcting the output of a magnetization vector detector of a stand alone navigation system of a mobile body, said mobile body having said magnetization vector detector and a geomagnetic vector detector, said method comprising:

detecting a magnetization vector $M_{n-1}$ with said magnetization vector detector, said magnetization vector being directed from a reference position toward the center of a magnetic circle which indicates the magnetized condition of the mobile body;

determining the direction of progression of the mobile body and detecting a geomagnetic vector $S_n$ which is directed from the reference position in the direction in which the mobile body progresses;

calculating an instantaneous direction vector $R_n$ which is directed from the center of the magnetic circle in the direction in which the mobile body progresses and which has a direction angle $\Theta_{mn}$ according to the equation $R_n = S_n - M_{n-1}$;

calculating an average geomagnetic intensity $r_{on}$ from the average of past values of the magnitude $r_n$ of the instantaneous direction vector $R_n$, and a weighing coefficient $h_n$ that is a positive real number no greater than 1 based on the average geomagnetic intensity $r_{on}$;

calculating a substantially instantaneous magnetization vector $H_n$ for correcting the magnetization vector $M_{n-1}$ according to the equation: $H_n = S_n - r_{on} \cdot \exp(j\Theta_{mn})$;

determining the corrected magnetization vector $M_n$ from the magnetization vector $M_{n-1}$, the weighing coefficient $h_n$, and the substantially instantaneous magnetization vector $H_n$ according to the equation: $M_n = (1-h_n) \cdot M_{n-1} + h_n \cdot H_n$ and correcting an output of said magnetization vector detector in accordance with said determined corrected magnetization vector.

2. A method of correcting the output of a magnetization vector detector of a stand alone navigation system of a mobile body having said magnetization vector detector and a geomagnetic vector detector, said method comprising:

detecting with said magnetization vector detector a magnetization vector $M_{n-1}$ directed from a reference position toward the center of a magnetic circle which indicates the magnetized condition of the mobile body;

detecting with said geomagnetic vector detector a geomagnetic vector $S_n$ which is directed from the reference position in the direction in which the mobile body progresses;

obtaining an output signal from an angular velocity sensor, and calculating a deviation vector $\Sigma$ ($\sigma_x$, $\sigma_y$) which indicates the deviation of the output signal of the angular velocity sensor from the geomagnetic vector;

determining if at least one of the components $\sigma_x$ and $\sigma_y$ is not less than a constant k;

if at least one of the components $\sigma_x$ and $\sigma_y$ is equal to or greater than the constant k, determining the corrected magnetization vector $M_n$ according to the equation $M_n = M_{n-1} + \Sigma$; and if the components $\sigma_x$ and $\sigma_y$ are both smaller than the constant k, calculating an instantaneous direction vector $R_n$ which is directed from the center of the magnetic circle in the direction in which the mobile body progresses and which has a direction angle $\Theta_{mn}$ according to the equation $R_n = S_n - M_{n-1}$;

calculating an average geomagnetic intensity $r_{on}$ from the average of past values of the magnitude $r_n$ of the instantaneous direction vector $R_n$, and a weighing coefficient $h_n$ that is a positive real number of or less than 1 based on the average geomagnetic intensity $r_{on}$;

calculating a substantially instantaneous magnetization vector $H_n$ for correcting the magnetization vector $M_{n-1}$ according to the equation: $H_n = S_n - r_{on} \cdot \exp(j\Theta_{mn})$;

determining the corrected magnetization vector $M_n$ from the magnetization vector $M_{n-1}$, the weighing coefficient $h_n$, and the substantially instantaneous magnetization vector $H_n$ according to the equation: $M_n = (1 - h_n) \cdot M_{n-1} + h_n \cdot H_n$ and correcting said magnetization vector detector output in accordance with said corrected magnetization vector.

3. A stand alone navigation system for a mobile body comprising:

a magnetization vector detector for detecting a magnetization vector $M_{n-1}$ directed from a reference position toward the center of a magnetic circle which indicates a magnetized condition of the mobile body;

means for detecting a geomagnetic vector $S_n$ which is directed from the reference position in a direction in which the mobile body progresses;

means for calculating an instantaneous direction vector $R_n$ which is directed from the center of the magnetic circle in the direction in which the mobile body progresses and which has a direction angle $\Theta_{mn}$ according to the equation $R_n = S_n - M_{n-1}$;

means for calculating an average geomagnetic intensity $r_{on}$ from the average of past values of the magnitude $r_n$ of the instantaneous direction vector $R_n$, and a weighing coefficient $h_n$ that is a positive real number no greater than 1 based on the average geomagnetic intensity $r_{on}$;

means for calculating a substantially instantaneous magnetization vector $H_n$ for correcting the magnetization vector $M_{n-1}$ according to the equation: $H_n = S_n - r_{on} \cdot \exp(j\Theta_{mn})$;

means for determining a corrected magnetization vector $M_n$ from the magnetization vector $M_{n-1}$, the weighing coefficient $h_n$, and the substantially instantaneous magnetization vector $H_n$ according to the equation: $M_n = (1 - h_n) \cdot M_{n-1} + h_n \cdot H_n$ and means for correcting the output of said magnetization vector detector in accordance with said corrected magnetization vector.

4. A stand alone navigation system of a mobile body comprising:

a magnetization vector detector for detecting a magnetization vector $M_{n-1}$ directed from a reference position toward the center of a magnetic circle which indicates a magnetized condition of the mobile body;

means for detecting a geomagnetic vector $S_n$ which is directed from the reference position in the direction in which the mobile body progresses;

an angular velocity sensor;

means for obtaining an output signal from said angular velocity sensor and calculating a deviation vector $\Sigma(\sigma_x, \sigma_y)$ which indicates the deviation of the output signal of the angular velocity sensor from the geomagnetic vector;

means for determining if at least one of the components $\sigma_x$ and $\sigma_y$ is not less than a constant k;

means for calculating a corrected magnetization vector $M_n$ according to the equation $M_n = M_{n-1} + \Sigma$ where said determining means determines that the constant k is less than at least one of $\sigma_x$ and $\sigma_y$ and means for correcting the output of said magnetization vector detector in accordance with said corrected magnetization vector.

5. The navigation system in accordance with claim 4, wherein said calculating means further calculates:

an instantaneous vector $R_n$ which is directed from the center of the magnetic circle in the direction in which the mobile body progresses and which has a direction angle $\Theta_{mn}$ according to the equation $R_n = S_n - M_{n-1}$;

an average geometric intensity $r_{on}$ from the average of past values of the magnitude $r_n$ of the instantaneous direction vector $R_n$, and a weighting coefficient $h_n$ that is a positive real number of or less than 1 based on the average geomagnetic intensity $r_{on}$;

a substantially instantaneous magnetization vector $H_n$ for correcting the magnetization vector $M_{n-1}$ according to the equation: $H_n = S_n - r_{on} \cdot \exp(j\Theta_{mn})$; and the corrected magnetization vector $M_n$ from the magnetization vector $M_{n-1}$, the weighting coefficient $h_n$, and the substantially instantaneous magnetization vector $H_n$ according to the equation: $M_n = (1 - h_n) \cdot M_{n-1} + h_n \cdot H_n$.

* * * * *